US008538841B2

(12) United States Patent
Menke

(10) Patent No.: US 8,538,841 B2
(45) Date of Patent: Sep. 17, 2013

(54) METHOD FOR ESTABLISHING AND ADMINISTERING A BENEFITS PROGRAM

(76) Inventor: Robert M. Menke, Tierra Verde, FL (US)

(*) Notice: Subject to any disclaimer, the term of this patent is extended or adjusted under 35 U.S.C. 154(b) by 1310 days.

(21) Appl. No.: 10/881,297

(22) Filed: Jun. 30, 2004

(65) Prior Publication Data
US 2006/0004657 A1 Jan. 5, 2006

(51) Int. Cl.
*G06Q 40/00* (2012.01)
(52) U.S. Cl.
USPC .......................................................... 705/35
(58) Field of Classification Search
USPC .......................................................... 705/35
See application file for complete search history.

(56) References Cited

U.S. PATENT DOCUMENTS
2005/0086142 A1* 4/2005 Geller et al. .................... 705/35

OTHER PUBLICATIONS

Risk Management Insurance 5th Edition, by Mark Dorfman, Prentice-Hall, pp. 45-48, 73-75, 98, 112-113, and 171-179.*

* cited by examiner

*Primary Examiner* — Leland Marcus
(74) *Attorney, Agent, or Firm* — Arthur W. Fisher III

(57) ABSTRACT

A system and method for establishing and administering a benefits program for enrollees of a membership association of tenants including an indemnity plan backed by a licensed surety to guarantee association participants of rental properties against property damage and/or loss of rents due to actions of any tenant as an association member, comprising the steps of marketing the benefits program to association participants, indemnifying the association participants, managing the benefits program by the association sponsor, issuing a surety bond certificate by the association sponsor to each association participant, accepting prospective program members into the benefits program upon payment of an enrollment fee and qualification, establishing a loss pool account with a predetermined portion of the enrollment fees received from each association participant, disbursing predetermined portions of the enrollment fees to the plan surety and the loss pool account and, optionally, to association participants, submitting and approving claims for property damage and/or loss of rent to the association sponsor and paying the association participants' approved claims from the loss pool account.

1 Claim, 3 Drawing Sheets

| Class Of Membership | (Bonded) Limit |
|---|---|
| A | $500 |
| B | $750 |
| C | $1000 |
| D | $1250 |
| E | $1500 |
| F | $1750 |
| G | $2000 |
| H | $2250 |
| I | $2500 |
| J | $2750 |
| K | $3000 |
| L | $3250 |
| M | $3500 |

FIG 2

METHOD FOR ESTABLISHING AND ADMINISTERING A BENEFITS PROGRAM

BACKGROUND OF THE INVENTION

1. Field of the Invention

A method of establishing and administering a benefits program including a property damage/rental loss surety indemnity plan for a predetermined group or pool of people such as apartment renters.

2. Description of the Prior Art

Rental tenants are generally required to advance a deposit guarantee when initially leasing or renting an apartment. The deposit guarantee usually includes first and last months' rent, cleaning fees and a damage deposit.

This deposit requirement, at a time when various utility deposits, moving and other contemporaneous expenses are incurred, often preclude a person from renting/leasing a desired property.

Thus, there is a need to lessen the cash needs upon entering into a lease. The method of the present invention rectifies this dilemma.

SUMMARY OF THE INVENTION

The present invention relates to a system and method for establishing and administering a benefits program for enrollees such as apartment renters including a plan to significantly reduce the financial burden usually associated when entering into a lease by apartment renters. Other benefits of membership can comprise moving company discounts; car rental discounts; discount pharmacy services; discount vision services; vitamin and nutritional supplement discounts; theme park discounts; movie ticket discounts; discount floral services and discount magazine subscriptions.

More specifically, the benefits program of the present invention includes a plan for an association sponsor to indemnify association participants of rental properties backed by a licensed surety company, as obligees against property damage and/or loss of rents due to actions of association members as renters or tenants of association participant landlords.

The system and method comprises the steps of issuing a surety bond to an association sponsor to guarantee its obligations, marketing the benefits program to association participants such as an apartment community, indemnifying the association participants against property damage and/or loss of rents due to actions of association members by delivering to participants a bond certificate, enrolling prospective association members in the benefits program, paying an enrollment fee by each prospective association member, accepting the prospective association members into the benefits program, establishing a claims pool account by the plan surety, submitting claims for property damage and/or loss of rent by association participants for payment, paying association participants' approved claims from the claims pool account and guaranteeing payment of such claims by the surety bond.

The invention accordingly comprises the features of construction, combination of elements, and arrangement of parts, which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 2 depicts the various membership classification of the system and method of the present invention.

Similar reference characters refer to similar parts throughout the several views of the drawings.

DETAILED DESCRIPTION OF THE PREFERRED EMBODIMENT

The present invention relates to a system and method for establishing and administering benefits program for enrollees such as apartment renters including a surety backed plan to significantly reduce the financial burden usually associated when entering into a lease by apartment renters.

Other benefits of membership can comprise moving company discounts; car rental discounts; discount pharmacy services; discount vision services; vitamin and nutritional supplement discounts; theme park discounts; movie ticket discounts; discount floral services and discount magazine subscriptions.

Figure 1:
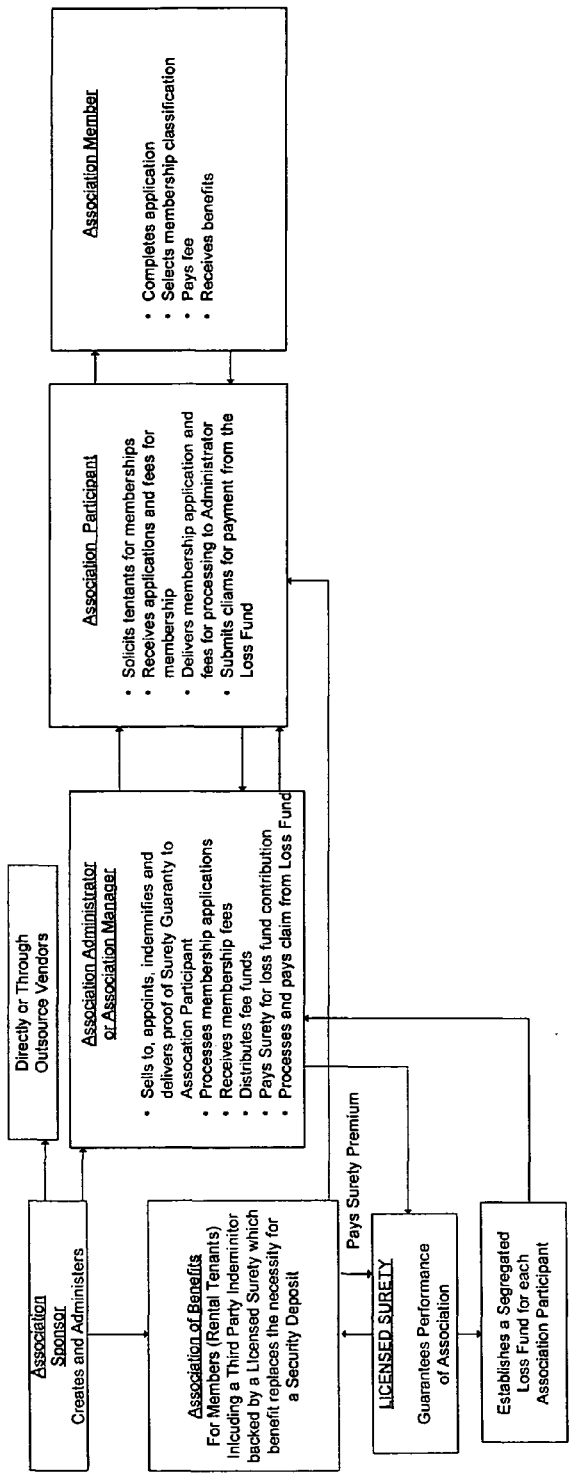
FIG. 1 is a block diagram of the various component elements of the system and method of the present invention.

Generally, the system and method provides a program of indemnification backed by a surety company to enrollees of a membership association of tenants (association members) to indemnify association participants of rental properties against property damage and/or loss of rents due to actions of any association member. FIG. 1 shows the interrelationship of the parties to the system including an association administrator which may be a department of the sponsor or outsourced appointed by an association sponsor to market the benefits program to association participants including a bond issued by a surety company to the association sponsor to indemnify the association participants. Upon payment of an enrollment fee and qualification, predetermined portions of the enrollment fee are disbursed to the association sponsor, plan surety and, optionally, to association participants, by the association sponsor. A loss pool account is established for each association participant through the surety with a predetermined portion of the enrollment fees received from each association member. Claims for property damage and/or loss of rent are submitted to the association sponsor for approval and payment.

Although the association sponsor may act as administrator, manager, sponsor and monitor of the benefits program plan as an entity, these activities are shown separately in the figures for clarity and because all such functions can be outsourced by the association sponsor.

The functional duties or step are described on an outsourcing basis: Association participants as membership selling agents are obligees under the surety bond issued by the plan surety. The association administrator shall establish and maintain segregated accounting or segregated accounts with respect to specific association participants, the total amount of association membership fees collected through the association participants; the total amount of collected association membership fees deposited in the claims pool account established and maintained by plan surety pursuant to the terms of the surety bond; the total amount of all claims paid to the association participants under the terms of the surety bond and the net amount of claim recoveries deposited by the plan surety in the claims pool account.

The plan surety establishes an account for the payment of claims referred to as the "Claims Pool Account" from the membership fees paid to the association sponsor or association manager. However, the liability of the plan surety under the bond shall never exceed the aggregate of such predetermined deposited amounts and any claim recoveries deposited into the Claims Pool Account. The surety will be the party having authority over the claims pool account for making disbursements.

Segregated accounting and/or segregated accounts shall apply to each association participant's attributable funds in the Claims Pool Account and any disbursements made to each such association participant. The plan surety has no obligation or liability for the payment of claims when the aggregate of all such payments to a specific association participant exceeds the balance in the Claims Pool Account attributable to such association participant at any given point in time; provided that as additional funds attributable to an association participant are deposited to the Claims Pool Account, the Surety will make additional claim disbursements to such association participant until the balance in the Claims Pool Account attributable to such association participant has been exhausted. Surety shall have no further liability to the involved association participant.

Any recoveries that are made either by an association participant, the association sponsor or their agents after the payment of any claim will be re-deposited with attribution into the Claims Pool Account net of the expenses associated with the collection process.

The association sponsor receives and compiles all documentation from association participant regarding claims filed. When the association administrator determines that the claim documentation is complete, the association administrator submits it to the association sponsor.

The association administrator has the authority to pursue recoveries from association member indemnitors. Where any claim has been made, recovery may be sought from the association member indemnitor. If a recovery is received after deduction of collection fees and costs, the balance is forwarded to the plan surety for credit to the Claims Pool Account. Attribution in the Claims Pool Account of such recovered funds is made to the particular association participant to whom the claim was paid.

Figure 3:
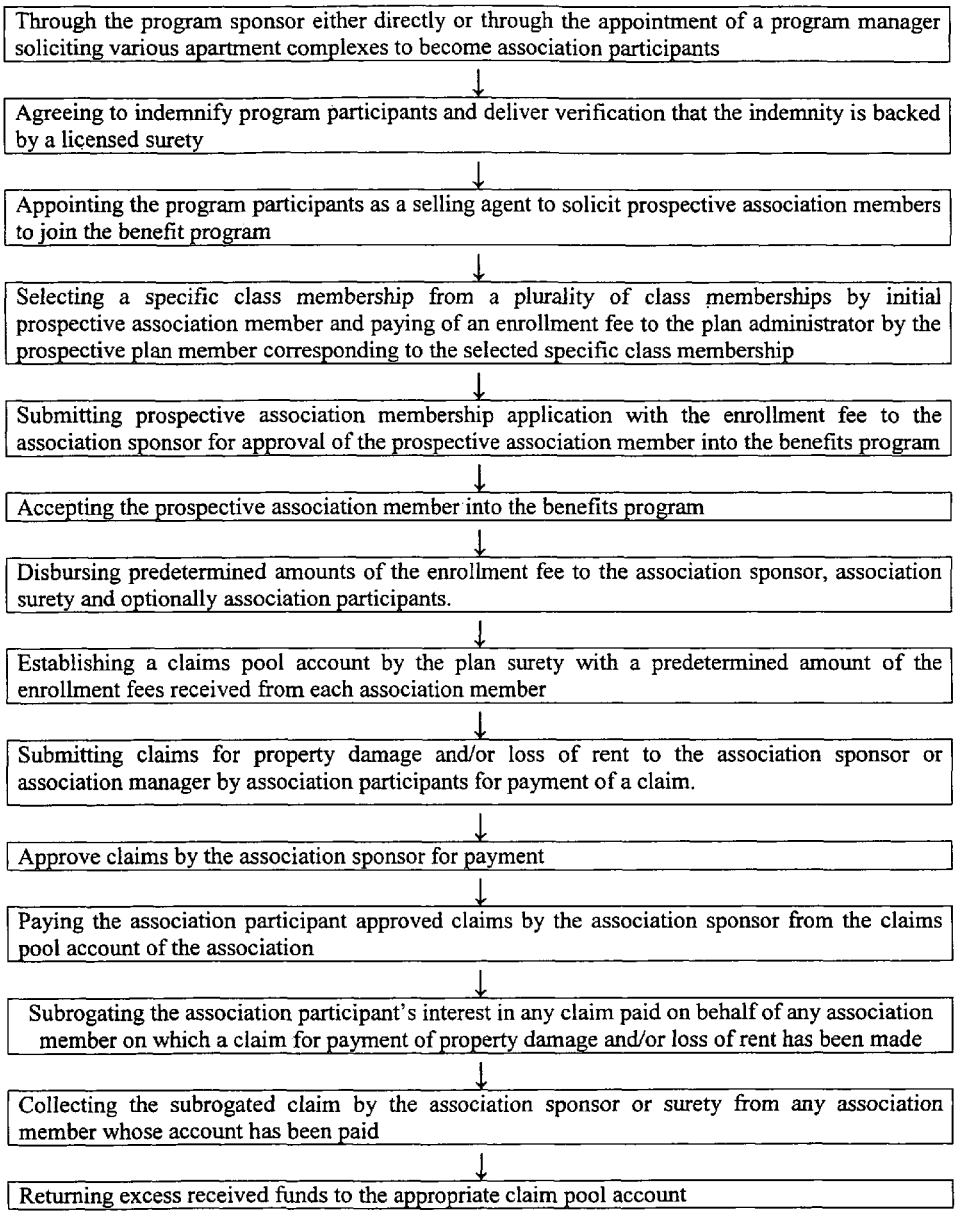
FIG. 3 is a flow chart depicting the sequential steps in implementing the system and method of the present invention.

As shown in FIG. 3, the system and method comprises the steps of issuing a surety bond certificate to an association participant by the association sponsor. The association administrator will market the benefits program to association participants such as an apartment community to indemnify the association participants against property damage and/or loss of rents due to actions of an association member, backed by a bond issued by a surety, soliciting prospective renters for membership as an association member to the benefit program by the association participant, enrolling prospective plan members in the benefits program by the association sponsor, selecting a specific class membership from a plurality of class memberships by each plan member, payment of an enrollment fee to the association sponsor by each prospective plan member corresponding to the selected specific class membership, paying enrollment fee by prospective plan member to plan sponsor, submitting the prospective plan member with the enrollment fee to the association sponsor for approval of the prospective plan member into the benefits program as an association member, accepting the prospective plan members into the benefits program, disbursing predetermined portions of the enrollment fee to, optionally, the association participant, and plan surety by the association sponsor, establishing a claims pool account, submitting claims for property damage and/or loss of rents to the association sponsor by the association participant for payment, approving claims for payment by the association sponsor, paying the association participant approved claims by the association sponsor from the specific claims pool account, subrogating the association participant's interest to the surety for any claim paid on behalf of any association member on which a claim for payment of property damage and/or loss of rent was made, collecting the subrogated claim by the association sponsor from any association member whose account had been paid and returning excess received funds to the claim pool account.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described,

What is claimed is:

1. A method for establishing and administering a benefits program for individual rental tenants as association members of respective rental properties including an indemnity surety plan including a group surety bond issued by a plan surety to an association sponsor independent of the plan surety who in turn issues separate surety bond certificates to each of a plurality of individual owners of rental properties as association participants to guarantee each respective association participant against property damage or loss of rents of individual rental tenants of said respective association participants using a computer processor including a microprocessor, an input device, memory printer and communication link inputting data from an association participant, said method comprising the steps of:

issuing a group surety bond by the plan surety and transmitting the group surety bond to the association sponsor, generating a separate surety bond certificate by the association sponsor for each of a plurality of association participants under the group surety bond issued by the plan surety to the association sponsor, accepting individual tenants as individual association members of a specific association participant into the benefits program upon payment of an enrollment fee by the individual tenants to the association sponsor, calculating and establishing a separate claims pool account for each association participant and disbursing portions of the enrollment fees received by the association sponsor from each association participant to the plan surety and to a separate claims pool account for each association participant, depositing any claim recoveries received on behalf of an association participant in that particular association participant's claims pool account, wherein the liability of the plan surety for any particular claims pool account under the group surety bond never exceeds the aggregate of that portion of the enrollment fees deposited in the particular claims pool accounts and any claim recoveries deposited into the individual claims pool accounts for the association participant of that particular claims pool account, submitting claims for property damage or loss of rents to the association sponsor by the association participant for payment from the respective separate claims pool account, receiving claims for property damage or loss of rent from an association participant by the association sponsor for an individual association member with that respective association participant, processing claims with the microprocessor for property damage or loss of rent received from an association participant by the association sponsor for an individual association member from the respective association participant, approving or disapproving claims for property damage or loss of rent received from an association participant by the association sponsor for an individual association member from the respective association participant, generating and paying the association participant approved claims by the association sponsor from the specific claims pool account of the association participant's separate claims pool account calculated by the microprocessor, subrogating the association participant's interest to the surety for any claim paid on behalf of any individual association member on which a claim for payment of property damage or loss of rent was made from the association participant's separate claims pool account, and collecting damage or loss of rent and collecting the subrogated claim by the association sponsor from any association participant whose separate claims pool account had been paid and returning excess received funds to the separate claims pool account of the claimant association participant.

* * * * *